(12) United States Patent
Pouchak et al.

(10) Patent No.: US 11,108,649 B2
(45) Date of Patent: Aug. 31, 2021

(54) CONTROL SYSTEM HAVING VARIOUS CAPABILITIES

(71) Applicant: Honeywell International Inc., Morris Plains, NJ (US)

(72) Inventors: Michael A. Pouchak, St Anthony, MN (US); Ravi Bharathi Krishnan, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/436,859

(22) Filed: Jun. 10, 2019

(65) Prior Publication Data

US 2020/0389365 A1    Dec. 10, 2020

Related U.S. Application Data

(60) Provisional application No. 62/859,583, filed on Jun. 10, 2019.

(51) Int. Cl.
*H04L 12/24* (2006.01)
*H04L 29/06* (2006.01)
*H04L 29/12* (2006.01)

(52) U.S. Cl.
CPC .............. *H04L 41/20* (2013.01); *H04L 63/04* (2013.01); *H04L 61/203* (2013.01); *H04L 63/08* (2013.01); *H04L 63/164* (2013.01)

(58) Field of Classification Search
CPC ........... H04L 12/2816; H04L 12/40032; H04L 63/0428; H04L 67/02; H04L 67/125; H04L 63/16; H04L 67/025; H04L 43/50; H04L 41/20; H04L 63/04; H04L 63/164; H04L 63/08; H04L 61/203
See application file for complete search history.

(56) References Cited

U.S. PATENT DOCUMENTS

| | | | |
|---|---|---|---|
| 8,418,128 | B2 | 4/2013 | Pouchak et al. |
| 8,532,797 | B2 | 9/2013 | Gutha et al. |
| 8,549,422 | B2 | 10/2013 | Gutha et al. |
| 8,640,120 | B2 | 1/2014 | Gutha et al. |
| 8,650,306 | B2 | 2/2014 | Pouchak |
| 8,738,793 | B2 | 5/2014 | Gutha et al. |

(Continued)

FOREIGN PATENT DOCUMENTS

CN     101354581 B     3/2011

OTHER PUBLICATIONS

"CIPer™ Model 10 Controller (/CIPer-Controllers/CIPer%E2%84%A2-Model-10-Controller)," Honeywell, 3 pages, 2019.

(Continued)

*Primary Examiner* — Jungwon Chang
(74) *Attorney, Agent, or Firm* — Seager, Tufte & Wickhem LLP (57) ABSTRACT

An integrated unitary internet protocol (IP) control system with a rapid spanning tree protocol (RSTP), multi-port high speed switch, supervisor, web display and/or an expansion plant input/output (IO) capabilities. The system may have communication modules associated with encrypted file subsystems integrated with an IO network. A resulting secure IP based communication network may be connected between a software framework and the hardware IO network.

15 Claims, 6 Drawing Sheets

(56) References Cited

U.S. PATENT DOCUMENTS

| | | |
|---|---|---|
| 8,793,668 B2 | 7/2014 | Gutha et al. |
| 8,842,653 B1 | 9/2014 | Rao et al. |
| 9,618,222 B1 * | 4/2017 | Hussain ............ G05D 23/1917 |
| 2003/0153988 A1 | 8/2003 | Shepard et al. |
| 2009/0113037 A1 | 4/2009 | Pouchak |
| 2010/0132331 A1 * | 6/2010 | Tsou ........................ F16J 15/48 |
| | | 60/226.2 |
| 2011/0004350 A1 * | 1/2011 | Cheifetz ................ H02J 3/382 |
| | | 700/276 |
| 2011/0160878 A1 | 6/2011 | Gutha et al. |
| 2011/0160879 A1 | 6/2011 | Gutha et al. |
| 2011/0161992 A1 * | 6/2011 | Gutha ...................... G06F 8/34 |
| | | 719/329 |
| 2015/0212714 A1 | 7/2015 | Hua et al. |
| 2016/0020910 A1 | 1/2016 | Jones et al. |
| 2017/0315522 A1 | 11/2017 | Kwon et al. |
| 2018/0252428 A1 * | 9/2018 | Malcolm ............ G05D 23/1919 |
| 2018/0267794 A1 * | 9/2018 | Atchison ................ H04L 67/34 |
| 2020/0285206 A1 * | 9/2020 | Young .................... G08B 19/00 |

OTHER PUBLICATIONS

"CIPer™ Model 30 HVAC Controller: Scalable, Fast and Flexible," Honeywell, 2 pages, May 2019.
"CIPer Controllers With Niagara 4 Framework," Honeywell, 3 pages, 2019.
"DVC-V304," Delta Controls, 3 pages, 2019.
"Technical Document: Niagara AX-3.X Browser Access Guide," Niagra Framework, 84 pages, May 30, 2007.
"Spyder: PUL-, PVL-, PUB-, PVB-Controllers," Honeywell, 422 pages, Mar. 2015.
European Search Report for Application No. 20179385.8-1218 dated Oct. 28, 2020.

* cited by examiner

CONTROL SYSTEM HAVING VARIOUS CAPABILITIES

This application claims the benefit of U.S. Provisional Patent Application Ser. No. 62/859,583, filed Jun. 10, 2019. U.S. Provisional Patent Application Ser. No. 62/859,583, filed Jun. 10, 2019, is hereby incorporated by reference.

BACKGROUND

The present disclosure pertains to controllers, and particularly to improved features of controllers.

SUMMARY

The disclosure reveals an integrated unitary internet protocol (IP) control system with a rapid spanning tree protocol (RSTP), multi-port high speed switch, supervisor, web display and/or an expansion plant input/output (IO) capabilities. The system may have communication modules associated with encrypted file subsystems integrated with an IO network. A resulting secure IP based communication network may be connected between a software framework and the hardware IO network.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

A powerful direct digital control (DDC) and integration control platform that is scalable and easy to use and meet building owners and contractors' seems to be needed for a highly secure and robust technical solution. One may combine heating, ventilation and air conditioning (HVAC) DDC control with the embedded workstation platform, and DDC controllers with embedded workstation platform software design. An embedded workstation platform event-driven approach (such as a Windows operating system (OS) or Unix OS environment) is not necessarily easily suited to real-time common in HVAC DDC control. The present system may solve an issue of combining high-power event needs for HVAC DDC Controls.

A present controller (CIPer™ 30) may combine benefits of a high speed commercial information technology (IT) infrastructure, friendly internet protocol (IP) networks with the robust and highly autonomous individual zone control (e.g., Spyder™ controller) with the great power and advantages of a Niagara™ integration platform. Cybersecurity may be built in from the ground floor and support scalable and high level security, including secure socket layer (SSL) encrypted communications and Fox security (FOXs) protocol between controllers. The current standard in building automation for BACnet™ IP and Lonworks™ does not necessarily appear to support this level of security.

A JACE is a mechanism or device that may provide connectivity to systems (e.g., HVAC, electrical, even security in some cases) within a building via the Niagara framework. By connecting common network protocols such as LonWorks, BACnet, and Modbus, along with many other networks, a unified system without seams may result.

The present system may be a collection of subsystems that are composed of key components. There may be an overall system performance that is easy to use, and represents a significant increase in performance and power over the related art. Some of the individual components that contribute to the system may include: a high speed built in 4-port switch with 1 Gbps performance; an overall system cost being ¼ of a cost of a combination controller and supervisor, separately; an open protocol Niagara N4 wire sheet; alarming, history, schedules, web server, and tagging; a built in IO of 3 UI/AI, 3 UI/AO, 6 DO with expansion modules modular enhancement up to 300 points total; an industry standard Niagara framework for reduced training; standard integration drivers, and open system solutions; built in analytics for preventative maintenance and predictive failure analysis; built in SSL encrypted communication and Federal information processing standard (FIPS) 140-2 level 1 compliance; easy communication between CIPer and a supervisor without expensive external components; a rapid spanning tree protocol (RSTP) that allows a ring architecture of up to forty controllers; a BACnet building controller (BBC); and standard workstation support for an industry standard interface. The present system may be built on other subsystems but represents a new platform in terms of overall layout, performance and cost.

Approaches may be introduced within the Niagara framework to allow for a subset of logic that is executed and associated with non-determinism may be handled, along with monitoring of the determinism quality, and properties and attain the desired performance. This may include a container with an approach to launch a subset of control logic blocks that may be executed in a defined manner of the performance.

Figure 1:
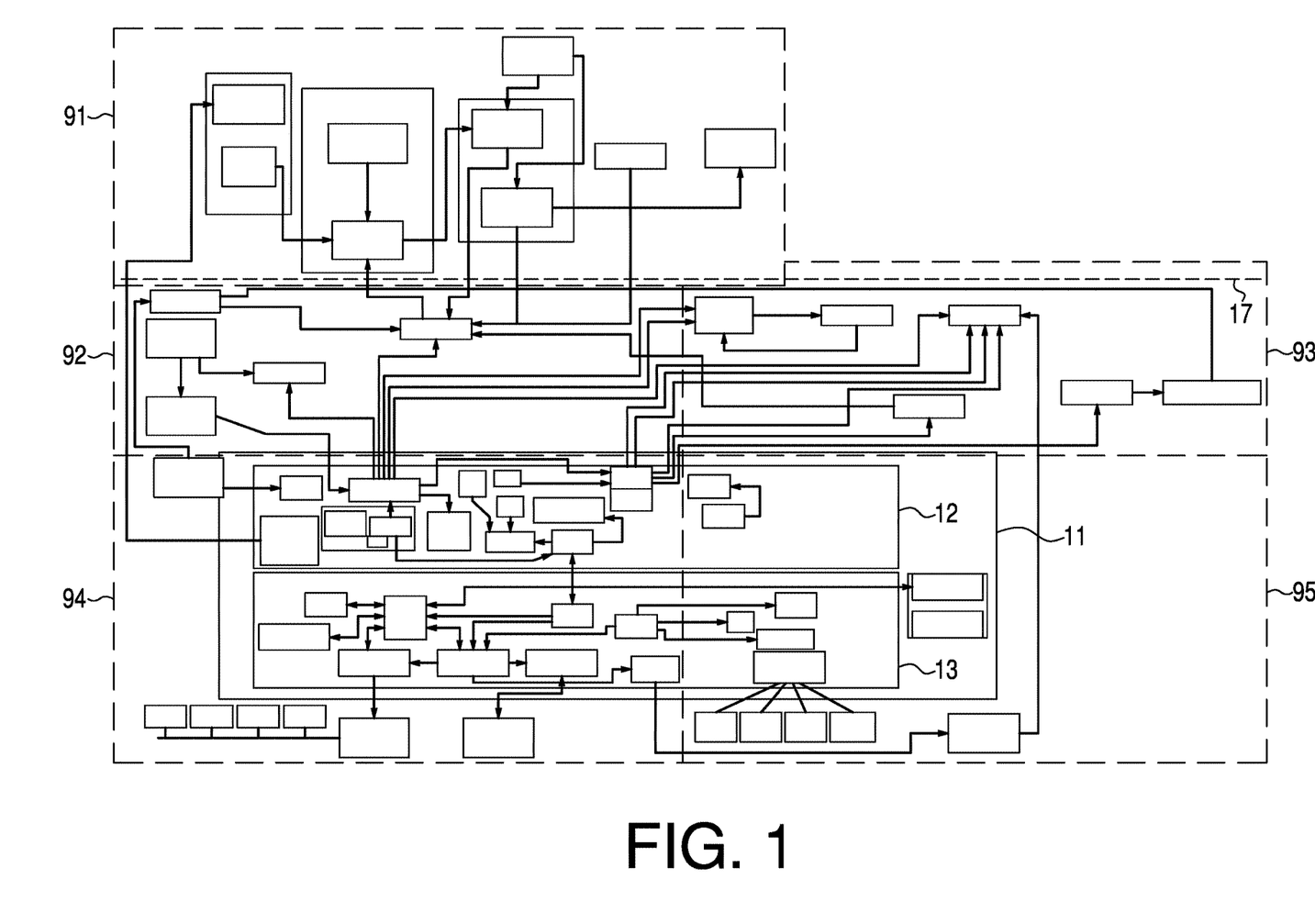
FIG. 1 is a diagram of the present system and approach.

An architecture diagram may be referred to in FIG. 1. Implementation details may incorporate the following items. 1) Function block executions may be sequenced; 2) Users may change the block sequence and control the order of execution; 3) Execution engine priority may be adjusted to ensure that the engine gets higher priority; 4) Engine logic may mark the starting millisecond in a second when the engine starts and executions begin (for example, if the engine starts at 20 ms of a second, next iteration may also be started at 0020, 1020, 2020, 3020, . . . N020 seconds); 5) Mechanisms may be put in place to detect deviations in the execution; 6) Mechanisms may be put in place to trend the execution time cycle for rectification in case of a deviation; and 7) Options may be available for the users to report out any misses in the execution cycle or anything else.

There may be a rapid control system prototyping solution with real time feedback. Buildings may consume a vast amount of the total energy consumed in the U.S. A significant portion of the energy consumed in buildings may be wasted because of the lack of controls or the inability to use existing building automation systems (BAS's) properly. Much of the waste may occur because of an inability to manage and control buildings efficiently. Many of these buildings currently do not use BAS's to monitor and control their energy systems from a central location. Buildings that use BAS's are typically large.

In general, the application of and control of custom DDC application programs depend on easy to use programming languages and reuse of libraries. In the past, frameworks such as Niagara combined with application programming environments have been successful due to the integration between the "function block" or block input/output graphical programming language and the application of controls in a real-time embedded controller. In the past, it appears to have been disruptive and time consuming to complete virtually all the processes of design from the start of the control strategy, to implementation, and to downloading. Often in advanced applications, there may be a large amount of iteration, and the cycle time of the iteration may be critical to success. It appears essential to solve the issue of a fast and reliable design using web architecture combined with quick downloads and quick feedback for the actual results of a control strategy.

The present system appears different from the related art due to a unique and efficient use of the compiled graphical programming image and its implementation in the event-driven Niagara framework. Past implementations of a web function block language were limited to a downloaded image that was first compiled graphically, and converted to an efficient storage mechanism that required sophisticated storage file sections in real-time file structures A complicated and non-volatile storage mechanism in the real time DDC controller needed a sophisticated segmentation of data and object information including a function block configuration, parameters, a Sylk™ configuration, network variables, BACnet and a Lon™ interface configuration, and other control network information parameters. The present approach appears significantly faster, and allows near instantaneous feedback of results. In addition, techniques have been implemented to take advantage of the IP network and allow powerful integration with a Niagara workbench.

The present system may be a result of segmenting the Niagara wire sheet in a system on module (Som) board and allowing all the configuration and actual implementation of the running real-time function block engine in the Som board under Niagara to communicate to the baseboard with some architectural extensions for high speed communications as noted in the following: 1) Configuration of the function blocks are maintained in the Niagara environment in XML and run directly on a Niagara event driven environment; 2) The Niagara event driven environment may have special modifications made that allow the function block engine and overall DDC performance to be maintained in a pseudo deterministic environment, allowing the power of the Niagara event-driven engine to be combined with a highly deterministic function block engine DDC dedicated controller with analog/digital (A/D) and IO performance; 3) The baseboard subsystem may be implemented in a highly efficient protocol that allows direct access to local subsystems such as Sylk, DO/AO/AI physical IO assignments and extension IO subsystems; 4) The baseboard subsystem may be implemented with a unique error message passing mechanism to help identify subsystem configuration issues without using slower configuration error data structures; 5). The baseboard subsystem may be implemented using a high speed serial port communicating to extremely low latency RAM/flash configuration approach that reduces many of the delays, file download times, and overhead; 6) Overall performance for configuration may be nearly instantaneous to the user, allowing near real time performance and no disruption to the design and trouble-shooting process; and 7) The normally separate action of enabling debugging may be eliminated due to the actual performance and IO feedback being given in the pseudo real-time Niagara wire sheet.

A sensor in the present system may be hardware device with some embedded software measuring/detecting & transmitting data (e.g., temperature, pressure, motion) software type. As embedded, software may run in a device/unit (firmware). Software may be incidental to the present controller, which may be deployed using software, or manually (without the software).

FIG. 1 is a diagram of a summary view of a controller 11 and associated components. FIGS. 2A, 2B, 2C, 2D and 2E show portions 91, 92, 93, 94 and 95, respectfully of FIG. 1.

Figure 2A:
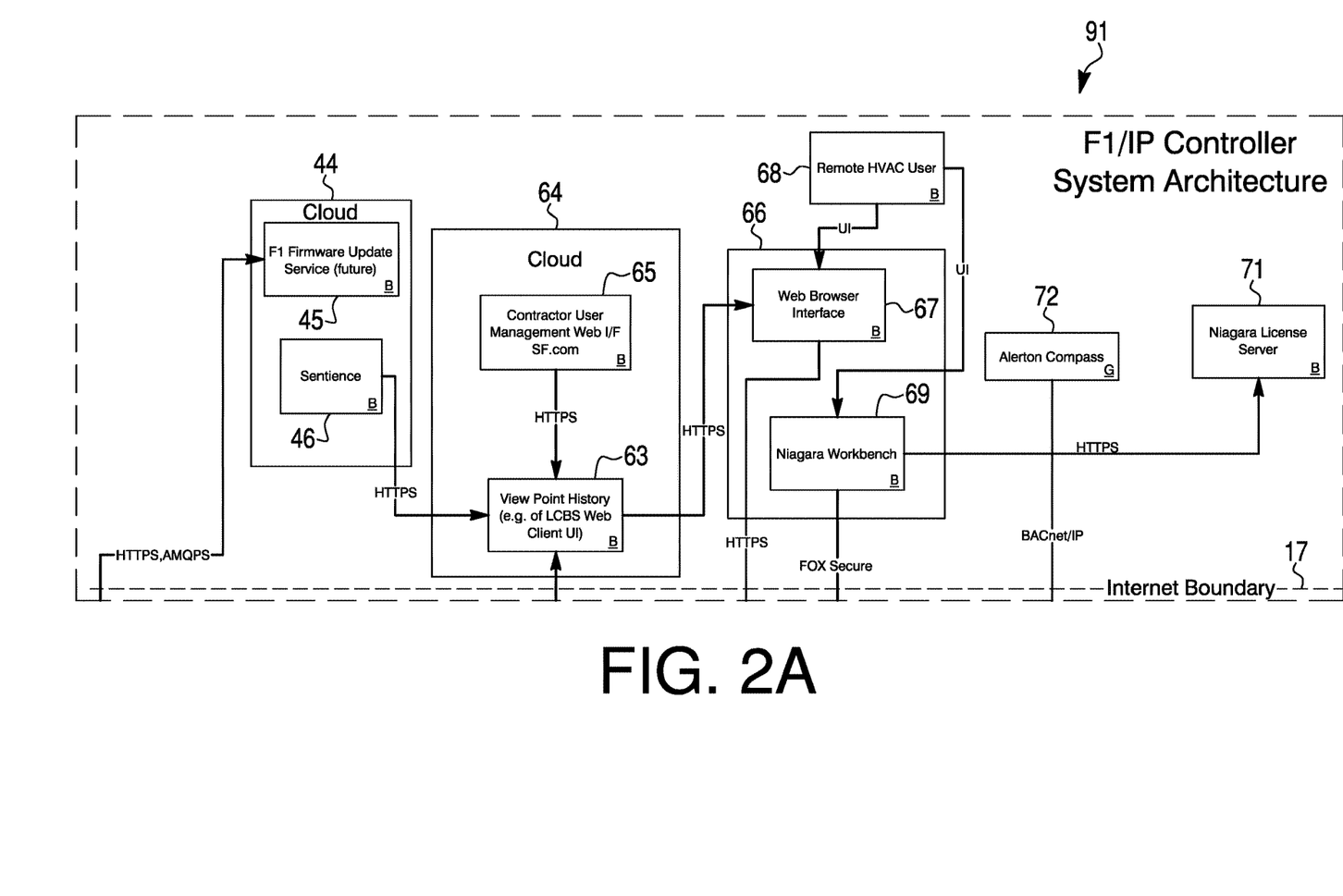
FIGS. 2A, 2B, 2C, 2D and 2E are diagrams of enlarged portions from FIG. 1.
Figure 2B:
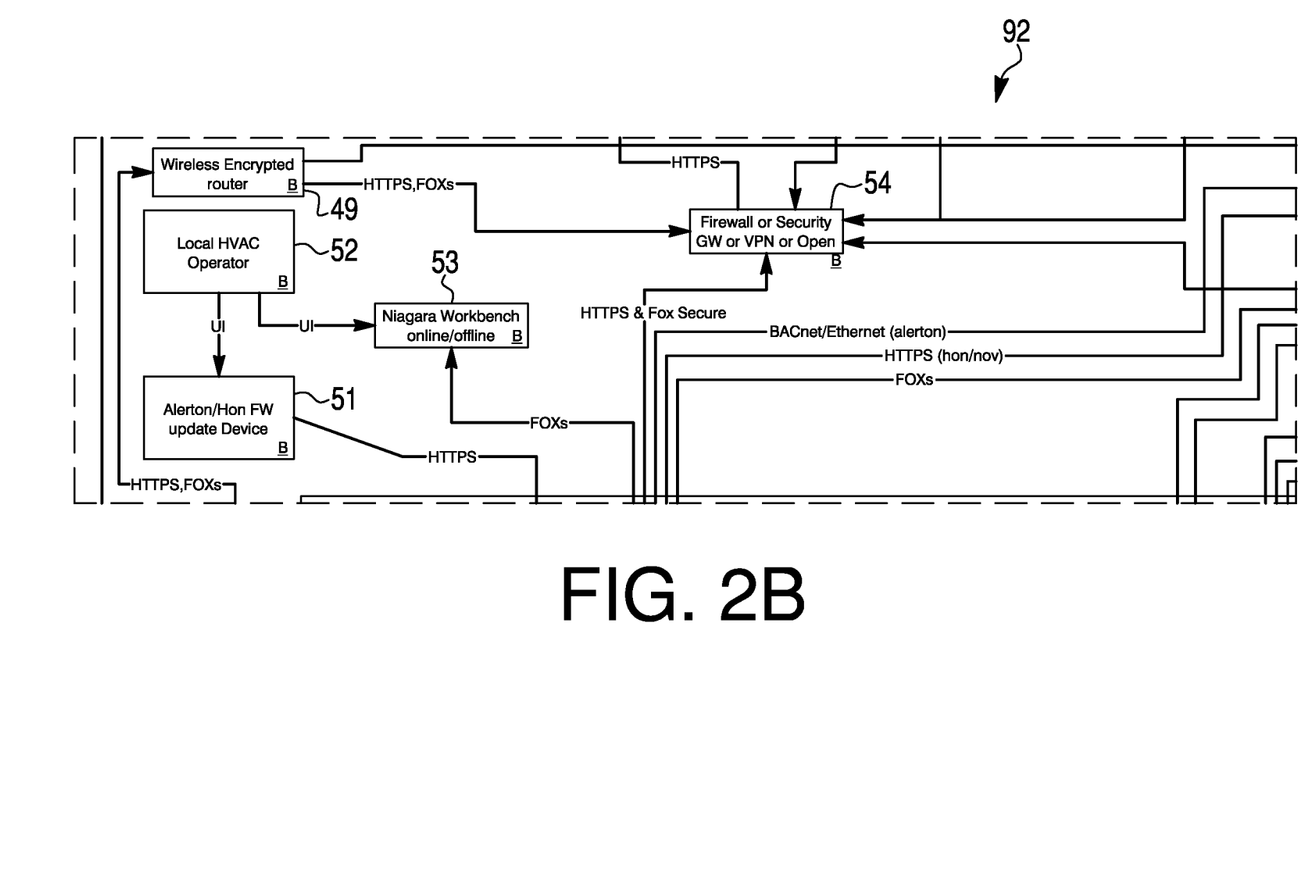
Figure 2C:
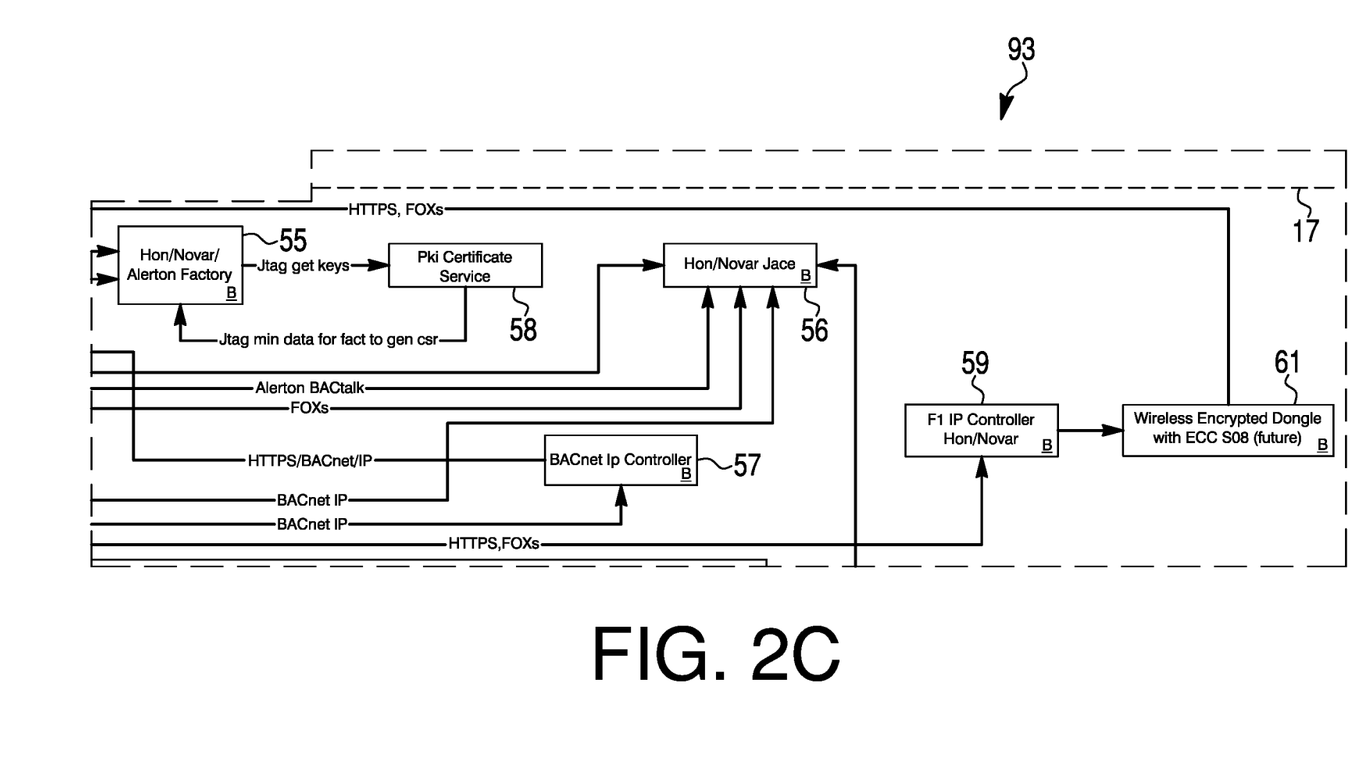
Figure 2D:
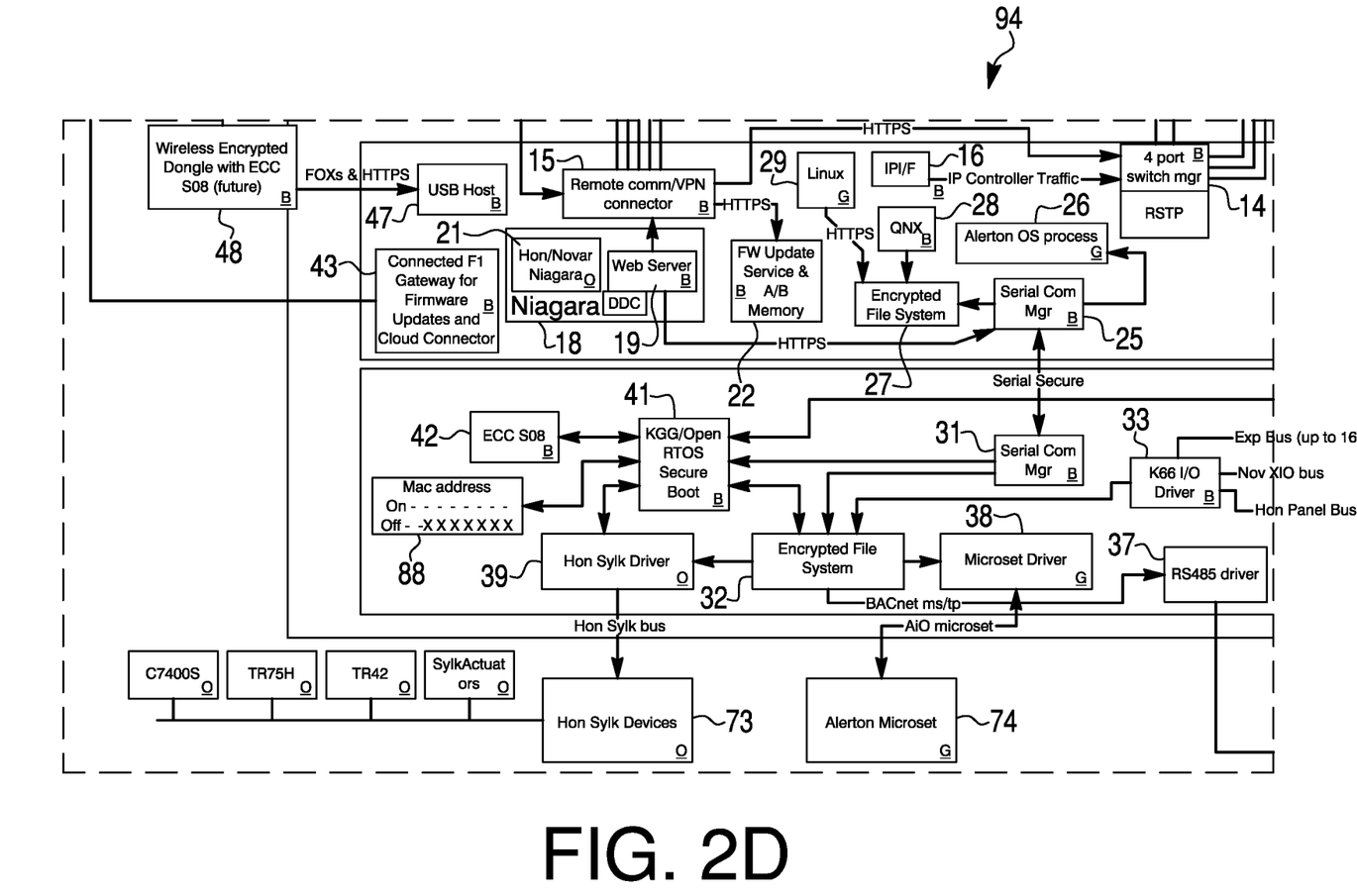
Figure 2E:
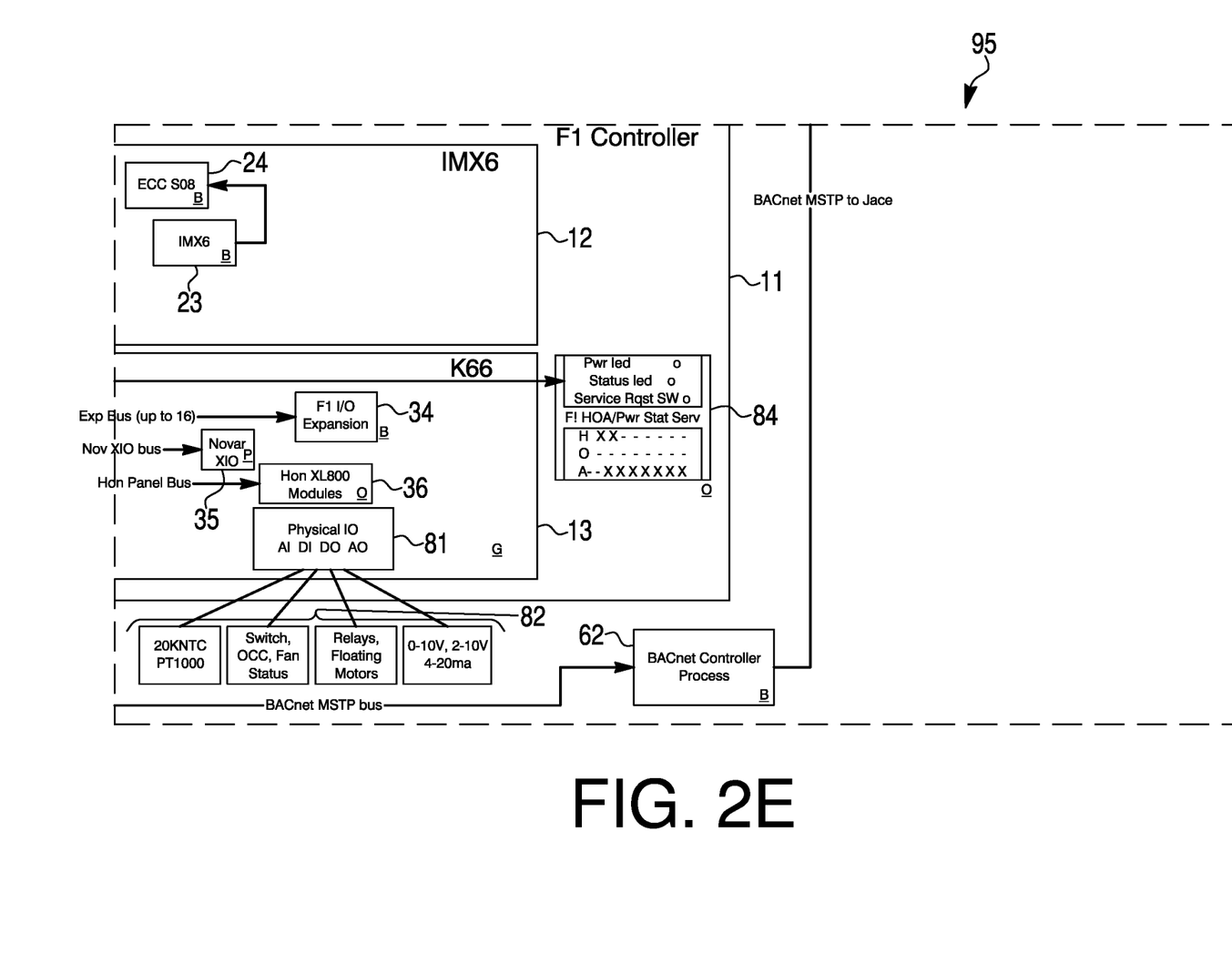

In FIGS. 2D and 2E show portions 94 and 95, respectfully, revealing that controller 11 may have a card or board 12 and a card or board 13. There may be just one board or more than two boards. For illustrative purposes, there may be two boards. Card 12 may have a 4-port switch 14 having a speed of one or more Gbps. Switch 14 may have an HTTPS input from a remote comm/VPN connector 15. Connector 15 may also have an input of IP controller traffic from IP I/F 16. Two other ports of switch may be connected outside of controller 11 and across an internet boundary 17. Remote comm/VPN 15 may have connections outside of controller 11.

A Niagara component 18 on board 12 may have a web server 19 and component 21 connected to remote comm/VPN connector 15. A function block engine may be situated in component 21 and have a direct digital control connection to remote comm/VPN connector 15. An HTTPS connection from remote comm/VPN connector 15 may go to an FW update service & A/B memory.

An IMX6 23 may be connected to an ECC 508 24. These components may be substituted with similar components from different makers. A serial communication mgr 25 may be connected to an operating system (OS) processor 26 and to an encrypted file system 27. An ONX 28 and a Linux 29 may be connected to encrypted file system 27.

Serial com mgr 25 of board 12 may have a connection to a serial com mgr 31 of board 13. There is serial security between components 25 and 31 via a high speed (e.g., greater than one Gbps) channel 85 connecting components 25 and 31. Data that are static and moving between components may be encrypted.

Serial com mgr 31 may be connected to an encrypted file system 32. An IO driver 33 may be connected to encrypted file system 32. Driver 33 may provide an expansion bus (up to 16) to controller IO expansion component 34, and signals to X10 bus 35 and panel bus signals to a company's XL800 modules 36. BACnet ms/tp signals may go from encrypted file system 32 to an RS 485 driver 37. Signals may go from encrypted file system 32 to a microset driver 38. Signals may also go from encrypted file system 32 to Sylk™ driver 39. An open RTOS-secure boot 41 may provide signals to encrypted file system 32 and to ECC 508 42. Mac address information from boot 41 may be provided to block 88.

A physical IO 81 may be associated with modules 36 and provide AI, DI, DO and AO terminals, which may connected to a variety of devices 82, for example, "20KNTC PT1000", "Switch, OCC, Fan Status", "Relays, Floating Motors", and "0-10V, 2-10V, 4-20 ma", respectively.

An HOA board 84 may be connected to open RTOS-secure boot 41. One part of board 84 may reveal Power, Status and Service Request SW, with LED's. Another part of board 84 may reveal HOA control, and hand-off-auto (HOA) switches. An H selection may enable an output to the web server, an 0 selection may disable an output to the web server, and an A selection may provide an automatic signal to the web server. With an A selection, the function block engine may be activated to output a signal or calculation command as directed by the automatic signal.

A connected controller 11 gateway 43 for firmware updates and a cloud connector, may provide HTTFS, AMQPS signals across internet boundary 17 to a controller 11 firmware update service component 45 of a cloud 44.

A USB host 47 may have a FOXs & HTTPS connection to a wireless encrypted dongle 48 with ECC 508. An HTTPS, FOXs connection may go from dongle 48 to a wireless encrypted router 49. A connection may go from a PW update device 51 to remote comm/VPN connector 15. A local HVAC operator station 52 may have a UI connection to FW update device 51 and a UI connection to a Niagara workbench 53 online/offline. A FOXs connection may go from remote comm/VPN connector 15 to Niagara workbench 53.

An HTTPS, FOXs may go from wireless encrypted router 49 to a firewall or security GW or VPN or open mechanism 54 shown in portion 92 of FIG. 2B. An HTTPS & FOX secure connection may go from remote comm/VPN connector 15 to mechanism 54 in portion 92 of FIG. 2B. A BACnet/Ethernet connection may go from remote comm/VPN connector 15 to factory 55. An HTTPS connection may go from remote comm/VPN connector 15 to factory 55.

Power over Ethernet (PoE) is a technology for wired Ethernet local area networks (LANs) that may allow the electrical current necessary for the operation of each device to be carried by the data cables rather than by power cords. This technology may be useful in expansion or chain connections of components such as subsystems, systems, controllers, and so forth.

A FOXs connection may go from remote comm/VPN connector 15 to a JACE 56 as shown in portion 93 of FIG. 2C. A BACnet connection may go from four-port switch mgr 14 to JACE 56. A FOXs connection may go from switch 14 to JACE 56. A BACnet IP connection may go from switch 14 to JACE 56. A BACnet IP connection may go from switch 14 to a BACnet to controller device 57. An HTTPS/BACnet/IP connection may go from device 57 to mechanism 54. A "jtag get Keys" connection may go from factory 55 to a Pki certificate service module 58. A "jtag min data for fact to gen csr" connection may go from Pki service module 58 to factory 55. An HTTPS FOXs connection may go from switch 14 to controller 11 box 59. A connection may go from box 59 to a wireless encrypted dongle 61, with ECC 508. An HTTPS, FOXs connection may go from wireless encrypted router 49 to wireless encrypted dongle 61.

A BACnet MSTP bus connection may go from driver 37 to a BACnet controller process module 62 in portion 95 of FIG. 2E. A BACnet MSTP to JACE connection may go from module 62 to JACE 56.

A connection HTTPS may go from a sentinence 46 of cloud 44 to a view point history module 63 (e.g., of LCBS web client UI) in portion 91 of FIG. 2A. An HTTPS connection may go from a contractor user management web I/F SF.COM module 65 of a cloud 64 to module 63. An HTTPS connection may go from mechanism 54 to module 63. An HTTPS connection may go from module 63 to a web browser interface 67 of a module 66. A remote HVAC user device 68 may have a UI connection to web browser 67 and a UI connection to a Niagara workbench 69 of module 66. An HTTPS connection may go from web browser interface 67 to mechanism 54. An HTTPS connection may go from Niagara workbench 69 to a Niagara license server 71. A FOX Secure connection may go from workbench 69 to mechanism 54. A compass 72 may have a BACnet/IP connection to mechanism 54.

Sylk driver 39 may have a Sylk bus connection to Sylk devices 73, such as, for example, modules C7400S, TR75H, TR42, and actuators. Microset driver 38 may have an AIO microset connection to a microset 74 set of devices.

To recap, an integrated network internet protocol (IP) control system may incorporate a software framework, a hardware input/output (IO) subsystem connected to the software framework, a direct digital control (DDC) subsystem connected to the hardware IO subsystem, and a secure IP based communication network connected between the software framework and the hardware IO subsystem. The software framework may incorporate event-driven software.

The secure IP based communication network may have a speed capability of at least one Gbps.

The control system may further incorporate a hand-off-auto (HOA) driver connected to the secure IP based communication network, and an HOA board connected to the HOA driver.

The control system may further incorporate a function block engine situated at and connected to the event-driven software framework, an IO network, and a communication network connected to the event-driven software framework and the IO network. A function block or combination of function blocks may be downloaded to the event-driven software framework in less than one second.

The communications network may be secure and have a speed of one Gbps or greater.

The communications network may incorporate a first serial communications module having a first encrypted file system associated with the event driven software framework; and a second serial communications module having a second encrypted file system associated with the IO network.

The network control system may further incorporate an IO driver connected to the second encrypted file system, and an IO expansion module for expanding a bus for a multiple number of controllers.

The network control system may further incorporate an HOA switch board, a HOA driver connected to the second encrypted file system that permits a signal of the HOA driver go to the event-driven software framework, which via a wire sheet enables the function block engine to perform an action according to the signal of the HOA driver.

Security of the secure IP based communication network may employ secure socket layer (SSL) encryption and FOX security protocol.

The event-driven software may provide one or more items of a group containing trends, alarms, histories, schedules, graphics, tags, and web servers.

An internet protocol controller may incorporate a software structure having a web server and a direct digital control module or a function block engine, a first communication module connected to the web server, a communication link having a first end connected to the first communication module and having a second end, a second communication module connected to the second end of the communication link, and an IO subsystem connected to the second communication module.

The IO subsystem may incorporate one or more items of a group having a Sylk driver, a microset driver, an RS485 driver, and a physical IO.

The controller may further incorporate a first encrypted file system connected to the first communication module, and a second encrypted file system connected to the second communication module.

The Sylk driver may be connected to an open RTOS secure boot, the microset driver may be connected to the second encrypted file system, the RS485 driver may be connected to the second encrypted file system, or the physical IO may be connected to an IO driver which in turn can be connected to the second encrypted file system.

When there is an RS485 driver, the RS485 driver may be connected to a BACnet process, which in turn can be connected to a JACE.

The controller may further incorporate a multi-port switch having a speed of at least one Gbps. One port may be connected to a remote communication VPN connector, which can be connected to a workbench for the software structure.

The controller may further incorporate a rapid spanning tree protocol (RSTP) connected to the multi-port switch. The RSTP may allow ring architecture for a multitude of controllers.

An approach for a controller may incorporate connecting a live view wire sheet to an event driven software framework, situating a function block engine in the software framework, connecting a web server of the software framework to a first serial communication component, connecting an IO system to a second serial communication component, and connecting the first and second serial communication components to each other with a serial communication channel.

The approach may further incorporate connecting a multi-port switch, having a speed of at least one Gbps, to an RSTP, a remote communication connector, and a JACE.

Signals on the first and second serial components and the serial communication channel may be encrypted. The IO system may send and receive signals to and from one or more items of a group incorporating wall modules, Sylk devices, microsets, sensors, HOA switches, and status indicators.

U.S. Pat. No. 10,200,203, issued Feb. 5, 2019; U.S. Pat. No. 8,375,402, issued Feb. 12, 2013; U.S. Pat. No. 9,726,392, issued Aug. 8, 2017; U.S. Pat. No. 8,983,632, issued Mar. 17, 2015; U.S. Pat. No. 8,954,543, issued Feb. 10, 2015; U.S. Pat. No. 8,650,306, issued Feb. 11, 2014; U.S. Pat. No. 8,418,128, issued Apr. 9, 2013; U.S. Pat. No. 8,239,500, issued Aug. 7, 2012; U.S. Pat. No. 8,112,162, issued Feb. 7, 2012; U.S. Pat. No. 7,826,929, issued Nov. 2, 2010; U.S. Pat. No. 7,738,972, issued Jun. 15, 2010; and U.S. Pat. No. 7,653,459, issued Jan. 26, 2010; are all hereby incorporated by reference.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An integrated network internet protocol (IP) control system comprising:
   a software framework;
   a hardware input/output (IO) subsystem connected to the software framework;
   a direct digital control (DDC) subsystem connected to the hardware IO subsystem; and
   a secure IP based communication network connected between the software framework and the hardware IO subsystem, the secure IP based communication network having a speed capability of at least one Gbps;
   a function block engine situated at and connected to the software framework;
   an IO network; and
   a communication network connected to the software framework and the IO network, the communication network comprising:
      a first serial communications module having a first encrypted file system associated with the software framework; and
      a second serial communications module having a second encrypted file system associated with the IO network;
   an HOA switch board;
   a HOA driver connected to the second encrypted file system that permits a signal of the HOA driver go to the software framework, which via a wire sheet enables the function block engine to perform an action according to the signal of the HOA driver; and
   wherein the software framework comprises event-driven software.

2. The integrated network IP control system of claim 1, further comprising:
   a hand-off-auto (HOA) driver connected to the secure IP based communication network; and
   an HOA board connected to the HOA driver.

3. The integrated network IP control system of claim 1, wherein a function block or combination of function blocks can be downloaded to the software framework in less than one second.

4. The integrated network IP control system of claim 3, wherein the communications network is secure and has a speed of one Gbps or greater.

5. The integrated network IP control system of claim 1, further comprising:
   an IO driver connected to the second encrypted file system; and
   an IO expansion module for expanding a bus for a multiple number of controllers.

6. The integrated network IP control system of claim 1, wherein security of the secure IP based communication network employs secure socket layer (SSL) encryption and FOX security protocol.

7. The integrated network IP control system of claim 1, wherein the event-driven software provides one or more items of a group comprising trends, alarms, histories, schedules, graphics, tags, and web servers.

8. An integrated network internet protocol (IP) control system comprising:
   a software framework;
   a hardware input/output (IO) subsystem connected to the software framework;
   a direct digital control (DDC) subsystem connected to the hardware IO subsystem; and
   a secure IP based communication network connected between the software framework and the hardware IO subsystem;

a function block engine situated at and connected to the software framework;

an IO network; and a communication network connected to the software framework and the IO network, the communication network comprising:

a first serial communications module having a first encrypted file system associated with the software framework; and     a second serial communications module having a second encrypted file system associated with the IO network;

an HOA switch board;

an HOA driver connected to the second encrypted file system that permits a signal of the HOA driver go to the software framework, which via a wire sheet enables the function block engine to perform an action according to the signal of the HOA driver;

wherein a function block or combination of function blocks can be downloaded to the software framework in less than one second; and wherein the software framework comprises event-driven software.

9. The integrated network IP control system of claim 8, wherein the secure IP based communication network has a speed capability of at least one Gbps.

10. The integrated network IP control system of claim 8, further comprising:

a hand-off-auto (HOA) driver connected to the secure IP based communication network; and     an HOA board connected to the HOA driver.

11. The integrated network IP control system of claim 8, wherein the communications network is secure and has a speed of one Gbps or greater.

12. The integrated network IP control system of claim 8, further comprising:

an IO driver connected to the second encrypted file system; and     an IO expansion module for expanding a bus for a multiple number of controllers.

13. The integrated network IP control system of claim 8, wherein security of the secure IP based communication network employs secure socket layer (SSL) encryption and FOX security protocol.

14. The integrated network IP control system of claim 8, wherein the event-driven software provides one or more items of a group comprising trends, alarms, histories, schedules, graphics, tags, and web servers.

15. An integrated network internet protocol (IP) control system comprising:

a software framework;

a hardware input/output (IO) subsystem connected to the software framework;

a direct digital control (DDC) subsystem connected to the hardware IO subsystem; and     a secure IP based communication network connected between the software framework and the hardware IO subsystem;

a function block engine situated at and connected to the software framework;

an IO network; and a communication network connected to the software framework and the IO network, the communication network comprising:

a first serial communications module having a first encrypted file system associated with the software framework; and         a second serial communications module having a second encrypted file system associated with the IO network;

an HOA switch board; and an HOA driver connected to the second encrypted file system that permits a signal of the HOA driver go to the software framework, which via a wire sheet enables the function block engine to perform an action according to the signal of the HOA driver.

* * * * *